March 7, 1950 V. D. GRIFFITH 2,499,747
FRAME FOR LICENSE PLATES AND THE LIKE
Filed Nov. 12, 1948
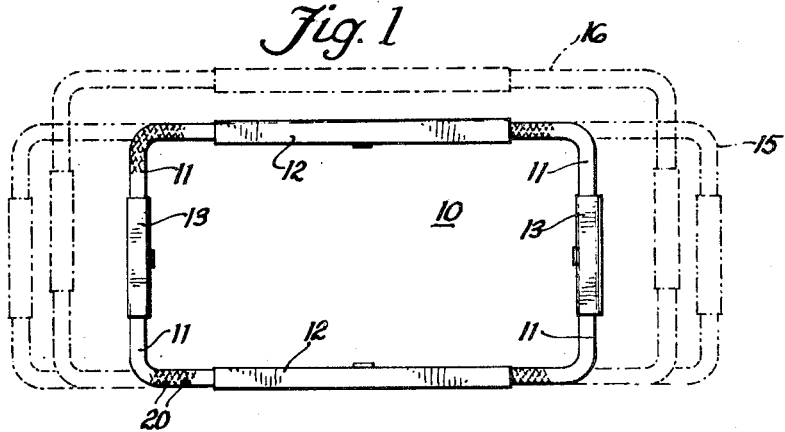
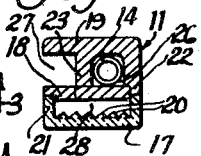
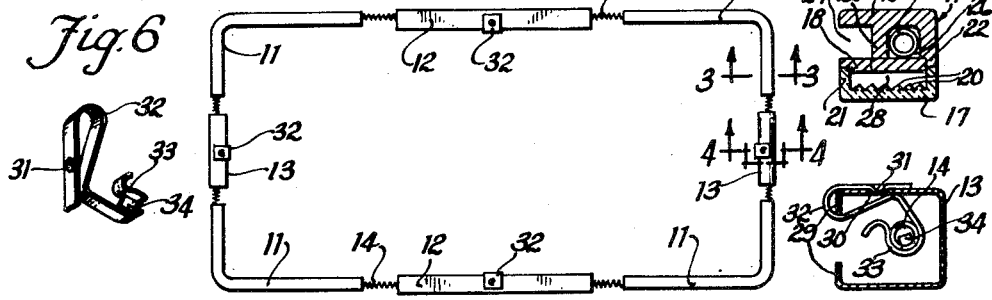
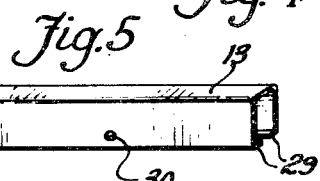
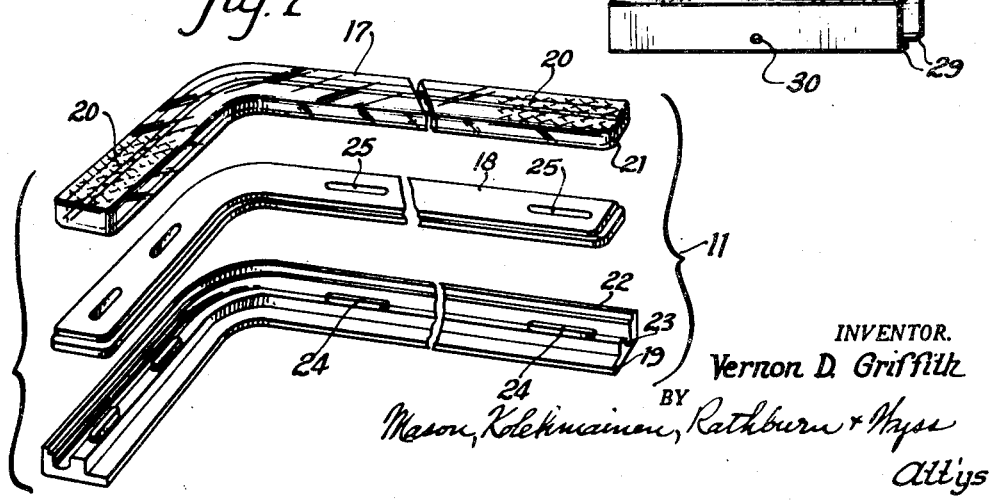
INVENTOR.
Vernon D. Griffith
BY Mason, Kolehmainen, Rathburn & Wyss
Att'ys Patented Mar. 7, 1950

2,499,747

UNITED STATES PATENT OFFICE 2,499,747

FRAME FOR LICENSE PLATES AND THE LIKE

Vernon D. Griffith, Omaha, Nebr.

Application November 12, 1948, Serial No. 59,638

16 Claims. (Cl. 40—125)

This invention relates to self-adjusting frames, more particularly to decorative and protective frames for vehicle license plates and the like, and the invention has for an object the provision of improved frames and frame parts of this character.

It has heretofore been proposed to provide decorative and protective frames adapted to be supported upon, or to support, the usual vehicle license plates, but such prior frame structures have not been entirely satisfactory due either to the high cost of manufacture, to the difficulty involved in adjusting the frame to license plates of different sizes or, in some cases, the complete lack of adjustability, or to the tendency of such frames to work loose and develop objectionable rattles during operation of the vehicle. Accordingly it is a further object of this invention to provide a self-adjusting license plate frame which is capable of resiliently and firmly gripping the peripheral edges of license plates of various sizes, which may be manufactured at low cost, which is highly decorative and which is formed in part of light reflecting material whereby an increased safety factor during operation or parking of the vehicle at night is obtained.

In carrying out the invention in one form a self-adjusting frame is provided comprising a plurality of corner-members having angularly extending legs, a plurality of side-bars respectively disposed between the corner-members in telescopic engagement with the legs thereof and resilient means urging the corner-members toward each other whereby the frame is resiliently urged toward a minimum periphery. More particularly each of the corner-members is provided with a plate-receiving groove in the inner surface thereof and with a passage extending therethrough from end to end and the side bars are of channel shape for telescopically receiving the legs of the corner-members and include an inwardly opening side in alignment with the grooves in the corner members. An endless spring extending through the side-bars and through the passages in the corner-members serves constantly to urge the frame toward a minimum periphery so as resiliently to engage the peripheral edges of a license plate disposed within the frame. In a preferred embodiment of the invention each of the corner-members is formed of a transparent plastic material which may be colored if desired and, in addition to the aforesaid passageway and groove passing therethrough, each corner-member is formed to provide a sealed reflecting chamber one wall of which is provided with suitable light reflecting means.

For a more complete understanding of the invention reference should now be had to the drawing in which:

Fig. 1 is a front elevational view of a license plate frame embodying the present invention, the frame being shown in full lines in its position of minimum periphery and being shown in broken lines in a plurality of extended positions;

Fig. 2 is an exploded rear view of the frame shown in Fig. 1 with the parts thereof in partially disassembled relation;

Fig. 3 is a sectional view on a larger scale taken along the line 3—3 of Fig. 2;

Fig. 4 is a similar sectional view taken along the line 4—4 of Fig. 2;

Fig. 5 is a detail perspective view of one of the side-bars employed in the frame of Fig. 1;

Fig. 6 is a detail perspective view of one of the spring engaging and positioning clips employed in the frame of Fig. 1; and Fig. 7 is an exploded perspective view of one of the light reflecting corner-members embodied in the frame of Fig. 1.

Referring now to the drawing, the invention is shown as embodied in a license plate frame 10 comprising a plurality of substantially L-shaped corner-members 11, a pair of top and bottom side-bars 12 and a pair of end side-bars 13. As will be explained more fully hereinafter the side-bars 12 and 13 are hollow being of substantially channel shape as shown best in Figs. 5 and 7, and the corner-members 11 are formed to provide passageways therethrough from end to end for receiving an endless spring 14 (Fig. 2) for resiliently urging the corner-members 11 toward each other and into the side-bars 12 and 13 which are adapted telescopically to engage the legs of the corner-members.

In Fig. 1 the frame 10 is shown in solid lines in its position of minimum periphery and as will be more apparent from the following description the frame may be extended lengthwise to a configuration indicated by the broken lines 15 in Fig. 1 and may likewise be extended both laterally and lengthwise to the position indicated by the broken lines 16 in Fig. 1. It will, of course, be understood that the positions represented by the broken lines 15 and 16 in Fig. 1 are illustrative only, as the frame may be adjusted to any desired configuration within the limits of the telescopic engagement of the corner-members 11 in the side-bars 12 and 13.

In the preferred embodiment of the invention shown the corner-members 11 are formed of transparent plastic material which may be colored if desired and as shown best in Fig. 3 and Fig. 7, each of the corner-members 11 comprises a front member 17, an intermediate partition member 18 and a rear member 19 which are adapted to be secured together to form the L-shaped corner-members 11. As shown, the front member 17 is provided on the rear surface of its front wall with a plurality of light reflecting facets or prisms 20 which serve to reflect any light transmitted thereto through the transparent front wall of the member 17. Likewise the front member 17 is provided with a rearwardly extending flange 21 which extends about the entire periphery of the reflecting front wall so as to provide a substantially cupshaped structure. The rear member 19 as shown best in Fig. 7 is provided with a forwardly extending outer flange 22 and with an intermediate forwardly extending flange 23, the front surface of which is provided with a plurality of rivet sections 24 which are adapted to be received in correspondingly located rivet holes 25 in the partition member 18.

In order to form the corner-members 11 the partition member 18 is placed on the rear member 19 so that the rivets 24 extend through the rivet holes 25 and the parts may then be secured together by the use of a heated riveting tool in a manner that will be well understood by those skilled in the art. After the parts 18 and 19 have been assembled the front member 17 may be secured to the partition member 18 by means of a suitable solvent or adhesive, and as will be seen best from Fig. 3, the assembled structure thus provides a longitudinal passageway 26 for receiving the spring 14, an inwardly opening groove 27 for receiving the peripheral edges of a license plate disposed within the frame, the passageway and the groove being separated by the flange 23 which constitutes partition means engageable by the spring and which also functions to protect the spring from engagement by the peripheral edges of the license plate and a sealed reflector chamber 28 which contains the facets or prisms 20 and which is substantially moisture proof.

The top and bottom side-bars 12 and the end side-bars 13 are identical in construction except for the length thereof and, as shown in Fig. 5, are channel shaped in cross-section and provided with inwardly extending flanges 29 for maintaining the telescopic engagement of the side-bars with the corner-members of the frame, while at the same time providing an open side for receiving the edge of a license plate frame. As shown in Fig. 5, each of the side bars is likewise provided with a clip receiving aperture 30 for receiving a locking nib 31 on positioning or connector means constituted by a suitable spring clip 32. As shown in Figs. 2, 6 and 7, the spring clips 32 are shaped to engage the rear walls of the side-bars 12 and 13 and to encircle one of the flanges 29 thereon, the end of the clip disposed within the side-bar being shaped to provide a spring-encircling portion 33 having a positioning finger 34 struck upwardly therefrom.

In order to assemble the frame a suitable length spring 14 is threaded through the four corner-members 11 and the ends of the spring are secured together by a suitable metal grommet (not shown) as will be well understood by those skilled in the art. The corner-members 11 may then be separated sufficiently by extending the spring 14 as indicated in Fig. 2 to permit the side-bars 12 and 13 to be placed over the portions of the spring intervening between adjacent corner-members, whereupon the corner members may be released so as to move inwardly into the side-bars in telescopic relation. The side-bars 12 and 13, being retained in position only by telescopic engagement with the legs of the corner-members 11, are free to move lengthwise and in order to position the side-bars properly relative to the corner-members 11 the spring clips 32 are provided, which may be snapped over the rear wall of each of the side-bars and engaged with the spring 14 so that the positioning finger 34 extends between selected convolutions of the spring, thereby to resiliently position the side-bars.

The frame when thus assembled may be positioned on any desired vehicle license plate or similar plate merely by extending the sides and ends of the frame to the desired peripheral contour so that the edges of the license plate will be received in the grooves 27 in the corner-members and in the open sides of the side-bars. Upon release of the frame the spring 14 resiliently urges the corner-members 11 inwardly so as to cause the frame to resiliently grip the license plate. If desired, suitable apertures or other means may be provided on one or more of the side bars 12 and 13 for receiving or cooperating with the usual license plate brackets which are employed on many types of vehicles, and as will be clear to those skilled in the art, the frame 10 does not interfere with the usual mounting screws and slots provided for supporting the license plate on the vehicle.

What is desired to be secured by Letters Patent of the United States is:

1. A self-adjusting frame comprising a plurality of corner-members having angularly extending legs and having a passage extending therethrough from end-to-end, a plurality of hollow side-bars, one of said side-bars being disposed between each pair of adjacent corner-members for telescopically receiving the juxtaposed ends of said legs, an endless spring extending through said side-bars and said passages for resiliently urging said corner-members into said side-bars, and removable clip means engageable with said side-bars and including finger means engageable between selected convolutions of said spring for positioning said side-bars relative to said corner-members.

2. A light reflecting corner-member for a license plate frame comprising a front wall formed of transparent material and having light reflecting means on the rear surface thereof, an outer wall extending rearwardly from said front wall, a rear wall extending from said outer wall in spaced parallel relation to said front wall, partition means intermediate said rear wall and said front wall and extending parallel thereto, inner and end walls extending rearwardly from said front wall to said partition means and cooperating therewith to define a sealed reflector chamber, and other partition means extending forwardly from said rear wall to said first mentioned partition means to form a passage extending through said corner-member and open only at the ends thereof and an inwardly facing groove extending throughout the length of said member.

3. A light-reflecting corner-member for a license plate frame comprising a front member formed of transparent material and having a continuous flange extending rearwardly from the peripheral edges thereof, the rear surface of said member within said flange having light reflecting facets thereon, a rear member having an outer flange extending forwardly from the outer edge thereof and an intermediate flange extending parallel to said outer flange, and a partition disposed intermediate said front and back members and cooperating with said flanges to form a sealed reflector chamber in said front member, a passage through said rear member open only at the opposed ends thereof, and an inwardly opening groove extending throughout the length of said rear member.

4. A self-adjusting license plate frame comprising a plurality of corner-members each having angularly extending legs provided with plate-retaining means extending therealong and each provided with a passage extending therethrough from end-to-end, a plurality of hollow side-bars disposed between said corner-members and slidably telescoped over the legs thereof, the inner side of each of said side-bars having a plate-receiving opening extending from end-to-end thereof, and tension spring means extending through said side-bars and said passages, each of said corner-members having internal partition means disposed between the passage and plate retaining means thereof for preventing engagement of said spring means by the peripheral edges of the license plate, said spring means bearing against the partition means of said corner-members for resiliently urging said frame toward a minimum periphery.

5. A self-adjusting license plate frame comprising a plurality of corner-members each having angularly extending legs and each having a passage extending therethrough from end-to-end, said legs having plate receiving grooves in the inner surfaces thereof extending along said legs, a plurality of hollow side-bars having plate receiving openings in the inner sides thereof, one of said side-bars being disposed between each pair of adjacent corner-members and slidably telescoped over the juxtaposed legs of the corner-members, and coil spring means extending through said side-bars and said passages, each of said corner-members being provided with internal spring engaging partition means separating the plate receiving groove thereof from the passage therethrough for preventing engagement of said coil spring means by the peripheral edges of a license plate disposed within the frame, said coil spring means engaging said partition means for resiliently urging said frame toward its minimum periphery.

6. A self-adjusting license plate frame comprising a plurality of corner-members each having angularly extending legs and each having a passage extending therethrough from end-to-end, said legs having plate receiving grooves in the inner surfaces thereof extending along said legs, each of said corner-members also being provided with internal spring engaging partition means separating the plate receiving groove thereof from the passage therethrough, a plurality of hollow side-bars having plate receiving openings in the inner sides thereof, one of said side-bars being disposed between each pair of adjacent corner-members and slidably telescoped over the juxtaposed legs of the corner-members, and coil spring means extending through said side-bars and said passages and engaging said partition means for resiliently urging said frame toward its minimum periphery, said plate receiving openings in said side-bars each being of greater width than said spring means but of lesser width than the thickness of said corner-members.

7. A self-adjusting license plate frame comprising a plurality of corner-members each having angularly extending legs and each having a passage extending therethrough from end-to-end, said legs having plate receiving grooves in the inner surfaces thereof extending along said legs, each of said corner-members also being provided with internal spring engaging partition means separating the plate receiving groove thereof from the passage therethrough, a plurality of hollow side-bars having plate receiving openings in the inner sides thereof, one of said side-bars being disposed between each pair of adjacent corner-members and slidably telescoped over the juxtaposed legs of the corner-members, coil spring means extending through said side-bars and said passages and engaging said partition means for resiliently urging said frame toward its minimum periphery, and positioning means at least in part carried by said side-bars for positioning said side-bars longitudinally relative to the legs of said corner-members.

8. A self-adjusting license plate frame comprising a plurality of corner-members each having angularly extending legs and each having a passage extending therethrough from end-to-end, said legs having plate receiving grooves in the inner surfaces thereof extending along said legs, each of said corner-members also being provided with internal spring engaging partition means separating the plate receiving groove thereof from the passage therethrough, a plurality of hollow side-bars having plate receiving openings in the inner sides thereof, one of said side-bars being disposed between each pair of adjacent corner-members and slidably telescoped over the juxtaposed legs of the corner-members, coil spring means extending through said side-bars and said passages and engaging said partition means for resiliently urging said frame toward its minimum periphery, said plate receiving openings in said side-bars each being of greater width than said spring means but of lesser width than the thickness of said corner-members, and positioning means at least in part carried by said side-bars for positioning said side-bars longitudinally relative to the legs of said corner-members.

9. A self-adjusting license plate frame comprising a plurality of corner-members each having angularly extending legs and each having a passage extending therethrough from end-to-end, said legs having plate receiving grooves in the inner surfaces thereof extending along said legs, each of said corner-members also being provided with internal spring engaging partition means separating the plate receiving groove thereof from the passage therethrough, a plurality of hollow side-bars having plate receiving openings in the inner sides thereof, one of said side-bars being disposed between each pair of adjacent corner-members and slidably telescoped over the juxtaposed legs of the corner-members, coil spring means extending through said side-bars and said passages and engaging said partition means for resiliently urging said frame toward its minimum periphery, said plate receiving openings in said side bars each being of greater width than said spring means but of lesser width than the thickness of said corner-members, and connector elements mounted on said side bars and engageable with said spring means at points between the juxtaposed ends of said legs for positioning said side bars longitudinally relative to the legs of said corner-members.

10. A self-adjusting frame comprising a plurality of corner-members having angularly extending legs and provided with plate retaining means, each of said corner members having a passage extending therethrough from end-to-end, a plurality of hollow side-bars, one of said side-bars being disposed between each pair of adjacent corner-members and slidably telescoped over the juxtaposed legs of the corner members, spring means extending through said side-bars and said passages and engaging a wall of each of said passages for resiliently urging said corner-members into said side-bars, and positioning elements mounted on said side-bars and engaging said spring means at points between the juxtaposed ends of said legs for positioning said side-bars longitudinally relative to the legs of said corner-members.

11. A self-adjusting frame comprising a plurality of corner-members having angularly extending legs and provided with plate retaining means, each of said corner members having a passage extending therethrough from end-to-end, a plurality of hollow side-bars, one of said side-bars being disposed between each pair of adjacent corner-members and slidably telescoped over the juxtaposed legs of the corner members, coil spring means extending through said side-bars and said passages and engaging a wall of each of said passages for resiliently urging said corner-members into said side-bars, and clip means removably engageable with said side-bars and provided with finger means engageable between selected convolutions of said spring means at points between the juxtaposed ends of said legs for positioning said side-bars longitudinally relative to said corner-members.

12. A self-adjusting frame for a vehicle license plate, comprising a plurality of substantially L-shaped corner-members formed of molded plastic material, said corner-members each having a passage extending therethrough from end-to-end and having a plate receiving groove in the inner surface thereof, a plurality of metal side-bars of channel shaped cross-section respectively disposed between said corner-members and slidably telescoped over the legs of said corner-members and each having an open side in alignment with said grooves, and spring means extending through said side-bars and said passages, each of said corner-members being provided with internal spring engaging partition means separating the plate receiving groove thereof from the passage therethrough for preventing engagement of said spring means by the peripheral edges of a license plate disposed within said frame, said spring being in engagement with said partition means for urging said corner-members inwardly, thereby resiliently to engage the periphery of said license plate.

13. A self-adjusting frame for a vehicle license plate, comprising a plurality of substantially L-shaped corner-members each comprising at least two molded plastic parts having facingly engaged surfaces adhered together to form the corner member assembly, the parts of each of said corner-members having a passage extending therebetween from end-to-end and having plate receiving means at the inner edge thereof, a plurality of side-bars of channel shaped cross-section respectively disposed between said corner-members and telescoped over the juxtaposed legs of the corner-members, each of said side bars having an open side in alignment with said grooves, spring means extending through said side bars and said passages for urging said corner-members inwardly in order resiliently to engage the periphery of a license plate disposed within said frame, and connector elements mounted on said side bars and engageable with said spring means at points between the juxtaposed ends of said legs for positioning said side-bars relative to said corner-members.

14. A self-adjusting frame for a vehicle license plate, comprising a plurality of substantially L-shaped corner-members each comprising at least two molded plastic parts having facingly engaged surfaces adhered together to form the corner member assembly, the parts of each of said corner-members having a passage extending therebetween from end-to-end and having a plate receiving groove at the inner edge thereof, each of said corner members being provided with an internal bearing wall throughout the length thereof which separates the passage therethrough from the plate receiving groove thereof and with a second wall which closes said passage along the outer edge of the member, a plurality of side-bars of channel shaped cross-section respectively disposed between said corner-members and telescoped over the juxtaposed legs of the corner-members, each of said side-bars having an open side in alignment with said grooves, coil spring means extending through said side-bars and said passages for urging said corner-members inwardly in order resiliently to engage the periphery of a license plate disposed within said frame, said open sides of said side-bars being of less width than the thickness of said corner-members but of greater width than said coil spring means, and connector elements respectively mounted on said side bars and engageable with the convolutions of said spring means at points between the juxtaposed ends of said legs for positioning said side-bars longitudinally relative to said corner-members.

15. A self-adjusting frame for a vehicle license plate, comprising a plurality of substantially L-shaped corner-members each comprising at least two molded plastic parts having facingly engaged surfaces adhered together to form the corner member assembly, and one of which is provided with an irregular light reflecting surface visible from the viewing side of the frame, the parts of each of said corner-members having a passage extending therebetween from end-to-end and having a plate receiving groove at the inner edge thereof, each of said corner members being provided with an internal bearing wall throughout the length thereof which separates the passage therethrough from the plate receiving groove thereof and with a second wall which closes said passage along the outer edge of the member, a plurality of side-bars of channel shaped cross-section respectively disposed between said corner-members and telescoped over the juxtaposed legs of the corner-members, each of said side-bars having an open side in alignment with said grooves, coil spring means extending through said side-bars and said passages for urging said corner-members inwardly in order resiliently to engage the periphery of a license plate disposed within said frame, said open sides of said side-bars being of less width than the thickness of said corner-members but of greater width than said coil spring means, and connector elements respectively mounted on said side bars and engageable with the convolutions of said spring means at points between the juxtaposed ends of said legs for positioning said side-bars longitudinally relative to said corner-members.

16. A corner-member for a self-adjusting license plate frame comprising substantially L-shaped front and back members formed of molded plastic material, outer flange means extending transversely from the outer edge of at least one of said front and back members to form an outer wall for said corner-member, intermediate flange means extending transversely from at least one of said front and back members in spaced parallel relation to said outer flange means, said front and back members when assembled together providing a spring-receiving passage between said flange means extending through said corner-member from end-to-end thereof and an inwardly-opening plate-receiving groove extending throughout the length of said corner-member.

VERNON D. GRIFFITH.

REFERENCES CITED

The following references are of record in the file of this patent:

UNITED STATES PATENTS

| Number | Name | Date |
|---|---|---|
| 1,755,625 | Bast et al. | Apr. 22, 1930 |
| 1,877,075 | Stephenson | Sept. 13, 1932 |
| 2,136,906 | McAdams | Nov. 15, 1938 |
| 2,296,596 | Brown | Sept. 22, 1942 |
| 2,442,967 | Barasch et al. | June 8, 1948 |